(12) United States Patent
Kaneda (10) Patent No.: US 6,668,101 B2
(45) Date of Patent: *Dec. 23, 2003

(54) IMAGE PROCESSING APPARATUS AND METHOD, AND COMPUTER-READABLE MEMORY (75) Inventor: Kitahiro Kaneda, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/329,202

(22) Filed: Jun. 10, 1999

(65) Prior Publication Data
US 2002/0122590 A1 Sep. 5, 2002

(30) Foreign Application Priority Data

Jun. 12, 1998 (JP) .......................... 10-165302
May 12, 1999 (JP) .......................... 11-131509

(51) Int. Cl.[7] .................................. G06K 9/32
(52) U.S. Cl. ................. 382/301; 382/190; 382/299; 345/472
(58) Field of Search ................. 382/175, 181, 382/185, 187, 177, 190, 298, 299, 301, 309, 112, 135, 137, 148, 173, 302, 312; 358/1.9, 1.11, 408, 505; 707/1, 102, 103 R, 104.1; 345/500, 472

(56) References Cited

U.S. PATENT DOCUMENTS

| 5,091,968 | A | * | 2/1992 | Higgins | 382/220 |
|---|---|---|---|---|---|
| 5,197,107 | A | * | 3/1993 | Katsuyama et al. | 382/209 |
| 5,214,717 | A | * | 5/1993 | Kimura et al. | 382/202 |
| 5,309,548 | A | * | 5/1994 | Ohta et al. | 358/1.9 |
| 5,317,654 | A | * | 5/1994 | Perry et al. | 382/101 |
| 5,337,372 | A | * | 8/1994 | LeCun et al. | 382/205 |
| 5,361,309 | A | * | 11/1994 | Sugiyama | 382/177 |
| 5,418,864 | A | * | 5/1995 | Murdock et al. | 382/309 |
| 5,509,092 | A | * | 4/1996 | Hirayama et al. | 382/301 |
| 5,619,594 | A | * | 4/1997 | Melen | 382/233 |
| 5,717,794 | A | * | 2/1998 | Koga et al. | 382/309 |
| 5,784,487 | A | * | 7/1998 | Cooperman | 382/175 |
| 5,809,183 | A |   | 9/1998 | Serizawa et al. | 382/301 |
| 5,917,944 | A | * | 6/1999 | Wakisaka et al. | 382/190 |
| 5,970,170 | A | * | 10/1999 | Kadashevich et al. | 382/187 |
| 6,041,143 | A | * | 3/2000 | Chui et al. | 382/232 |
| 6,373,592 | B1 | * | 4/2002 | Ito | 358/1.2 |

FOREIGN PATENT DOCUMENTS

JP          59-43480        3/1984

OTHER PUBLICATIONS

"The FlashPix™ Image File Format", by Christopher Hauf and Scott Houchin, The Fourth Color Imaging Conference: Color Science, Systems and Applications, 1996, pp. 234–238.

"Information–based Image Dissimilarity Measure", by Ahmed Ghali et al., Optical Engineering, Society of Photo–Optical Instrumentation Engineers, vol. 37, No. 3, Mar. 1, 1998, pp. 808–812.

An Automatic System For Digitizing Line Drawings (Video–Scan), by I. Nackunstz, Proceedings of the 6th International Conference On Pattern Recognition, Munich, West Germany, Oct. 19–22, 1982, p. 1196.

* cited by examiner

Primary Examiner—Daniel G. Mariam
(74) Attorney, Agent, or Firm—Fitzpatrick, Cella, Harper & Scinto (57) ABSTRACT An input image is converted into an image in a predetermined format. An optimal character recognition resolution determination unit determines, using the converted image, an optimal resolution to be used upon executing character recognition of the input image. A character recognition circuit executes character recognition of the input image on the basis of the determination result. An output circuit outputs the recognition result.

22 Claims, 11 Drawing Sheets

| Property name | ID Code | Type |
|---|---|---|
| Number of resolutions | 0x01000000 | VT_UI4 |
| Highest resolution width | 0x01000002 | VT_UI4 |
| Highest resolution height | 0x01000003 | VT_UI4 |
| Default display height | 0x01000004 | VT_R4 |
| Default display width | 0x01000005 | VT_R4 |
| Default height / width units | 0x01000006 | VT_UI4 |

| Property name | ID Code | Type |
|---|---|---|
| Subimage width | 0x02ii0000 | VT_UI4 |
| Subimage height | 0x02ii0001 | VT_UI4 |
| Subimage color | 0x02ii0002 | VT_BLOB |
| Subimage numerical format | 0x02ii0003 | VT_UI4 \| VT_VECTOR |
| Decimation method | 0x02ii0004 | VT_I4 |
| Decimation prefilter width | 0x02ii0005 | VT_R4 |
| Subimage ICC profile | 0x02ii0007 | VT_UI2 \| VT_VECTOR |

| Property name | ID Code | Type |
|---|---|---|
| JPEG tables | 0x03ii0001 | VT_BLOB |
| Maximum JPEG table index | 0x03000002 | VT_UI4 |

FIG. 9

| Field name | Length | Bytes (s) |
|---|---|---|
| Length of header stream header | 4 | 0-3 |
| Image width | 4 | 4-7 |
| Image height | 4 | 8-11 |
| Number of tiles | 4 | 12-15 |
| Tile width | 4 | 16-19 |
| Tile height | 4 | 20-23 |
| Number of channels | 4 | 24-27 |
| Offset to tile header table | 4 | 28-31 |
| Length of tile header entry | 4 | 32-35 |
| Tile header table | variable | variable | ns
IMAGE PROCESSING APPARATUS AND METHOD, AND COMPUTER-READABLE MEMORY

BACKGROUND OF THE INVENTION

The present invention relates to an image processing apparatus and method, and a computer-readable memory.

A conventional image processing apparatus having a character recognition function basically recognizes a binary image of a given resolution. On the other hand, the character recognition precision is intimately associated with the resolution of an input image.

However, since the conventional image processing apparatus recognizes only an image of a given resolution, character recognition is not always done under an optimal condition in terms of recognition precision.

SUMMARY OF THE INVENTION

The present invention has been made in consideration of the above-mentioned problem, and has as its object to provide an image processing apparatus and method which can improve character recognition precision, and a computer-readable memory.

In order to achieve the above object, an image processing apparatus according to the present invention comprises the following arrangement.

That is, an image processing apparatus comprises:
conversion means for converting an input image into an image in a predetermined format;
determination means for determining, a resolution to be used upon executing character recognition of the input image, using the image converted by the conversion means;
recognition means for performing character recognition of the input image on the basis of a determination result of the determination means; and
output means for outputting a recognition result of the recognition means.

In order to achieve the above object, an image processing method according to the present invention comprises the following arrangement.

That is, an image processing method comprises:
the conversion step of converting an input image into an image in a predetermined format;
the determination step of determining, a resolution to be used upon executing character recognition of the input image, using the image converted in the conversion step;
the recognition step of performing character recognition of the input image on the basis of a determination result in the determination step; and
the output step of outputting a recognition result of the recognition step.

In order to achieve the above object, a computer-readable memory according to the present invention comprises the following arrangement.

That is, a computer-readable memory comprises:
a program code of the conversion step of converting an input image into an image in a predetermined format;
a program code of the determination step of determining, a resolution to be used upon executing character recognition of the input image, using the image converted in the conversion step;
a program code of the recognition step of performing character recognition of the input image on the basis of a determination result in the determination step; and
a program code of the output step of outputting a recognition result of the recognition step.

In order to achieve the above object, an image processing apparatus according to the present invention comprises the following arrangement.

That is, an image processing apparatus comprises:
input means for inputting file data containing a plurality of images which are generated based on a single image and have different resolutions;
determination means for determining, a resolution to be used upon executing character recognition, using the plurality of images input by the input means; and
control means for controlling to store the resolution as a determination result of the determination means in the file data.

In order to achieve the above object, an image processing method according to the present invention comprises the following arrangement.

That is, an image processing method comprises the steps of:
inputting file data containing a plurality of images which are generated based on a single image and have different resolutions; and
controlling to determine, a resolution to be used upon executing character recognition, using the plurality of input images, and to store the resolution as a determination result in the file data.

In order to achieve the above object, a computer-readable memory according to the present invention comprises the following arrangement.

That is, a computer-readable memory comprises:
a program code of the input step of inputting file data containing a plurality of images which are generated based on a single image and have different resolutions;
a program code of the determination step of determining, a resolution to be used upon executing character recognition, using the plurality of images input in the input step; and
a program code of the storage step of storing the resolution as a determination result in the determination step in the file data.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

The preferred embodiments of the present invention will be explained in detail hereinafter with reference to the accompanying drawings.

[First Embodiment]

Figure 1:
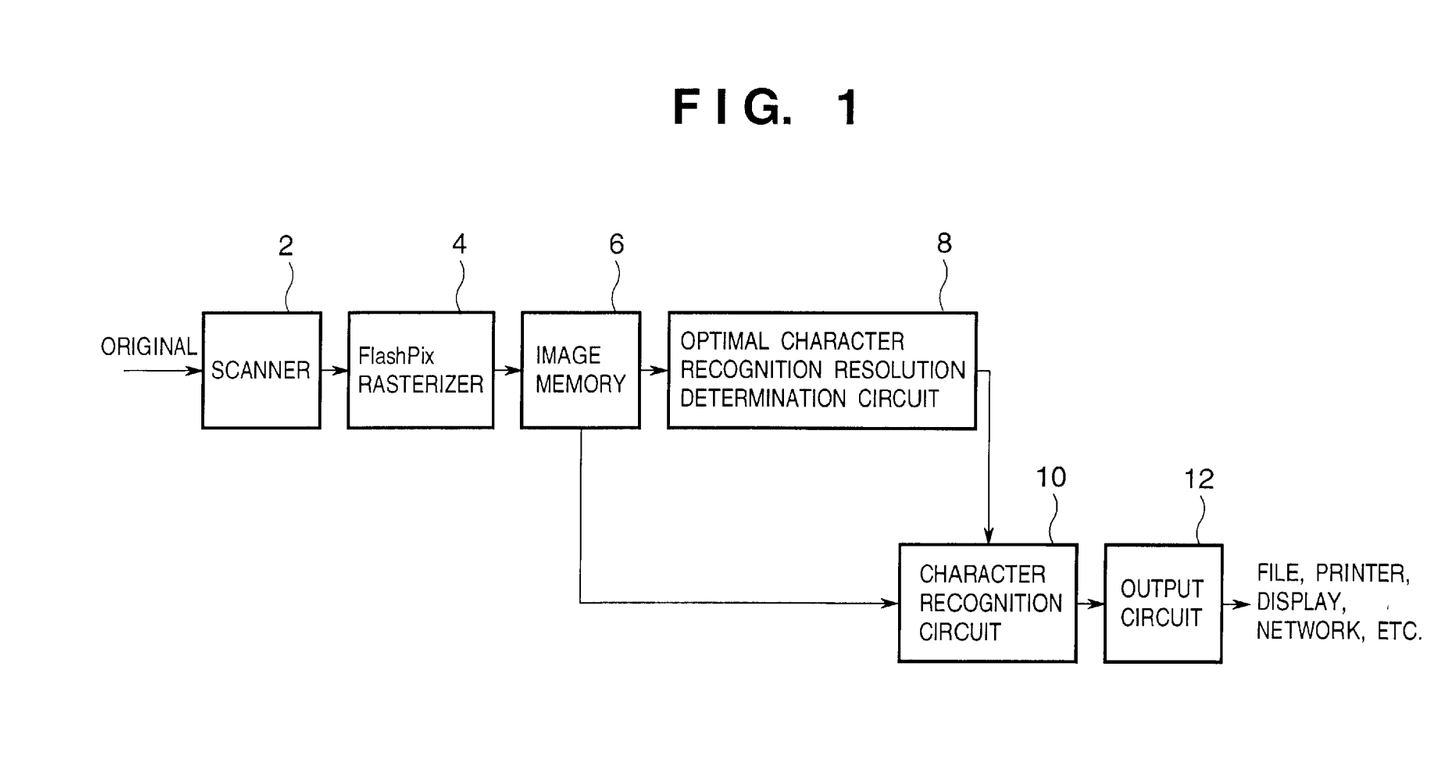
FIG. 1 is a block diagram showing the functional arrangement of an image processing apparatus according to the first embodiment of the present invention.

FIG. 1 is a block diagram showing the functional arrangement of an image processing apparatus according to the present invention.

Referring to FIG. 1, reference numeral 2 denotes a scanner for inputting an original image. Note that the original image need not always be input by the scanner 2. For example, an image sensed by a digital camera, an image stored in a storage device, or the like may be input. Reference numeral 4 denotes a FlashPix rasterizer for converting an image input by the scanner 2 into a FlashPix image as one of file formats for images. Reference numeral 6 denotes an image memory for storing a FlashPix image converted by the FlashPix rasterizer 4.

Reference numeral 8 denotes an optimal character recognition resolution determination circuit for determining a resolution optimal to character recognition on the basis of the image stored in the image memory 6. Reference numeral 10 denotes a character recognition circuit for performing final character recognition of the image stored in the image memory 6 on the basis of the determination result of the optimal character recognition resolution determination circuit 10. Reference numeral 12 denotes an output circuit for outputting the recognition result of the character recognition circuit 10 to a storage device, printer, display, network, and the like.

The file format of a FlashPix image will be briefly explained below.

Figure 4:
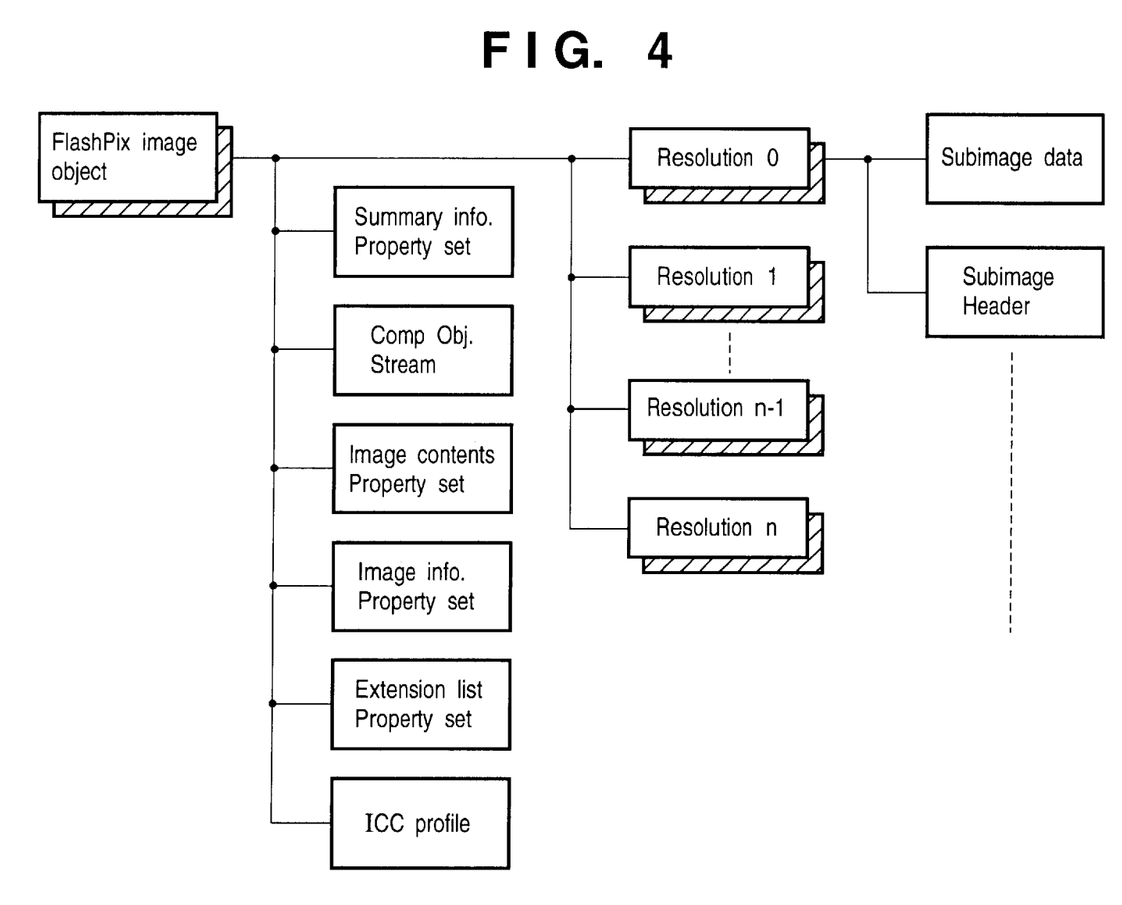
FIG. 4 shows an example of a structured image file.
Figure 5:
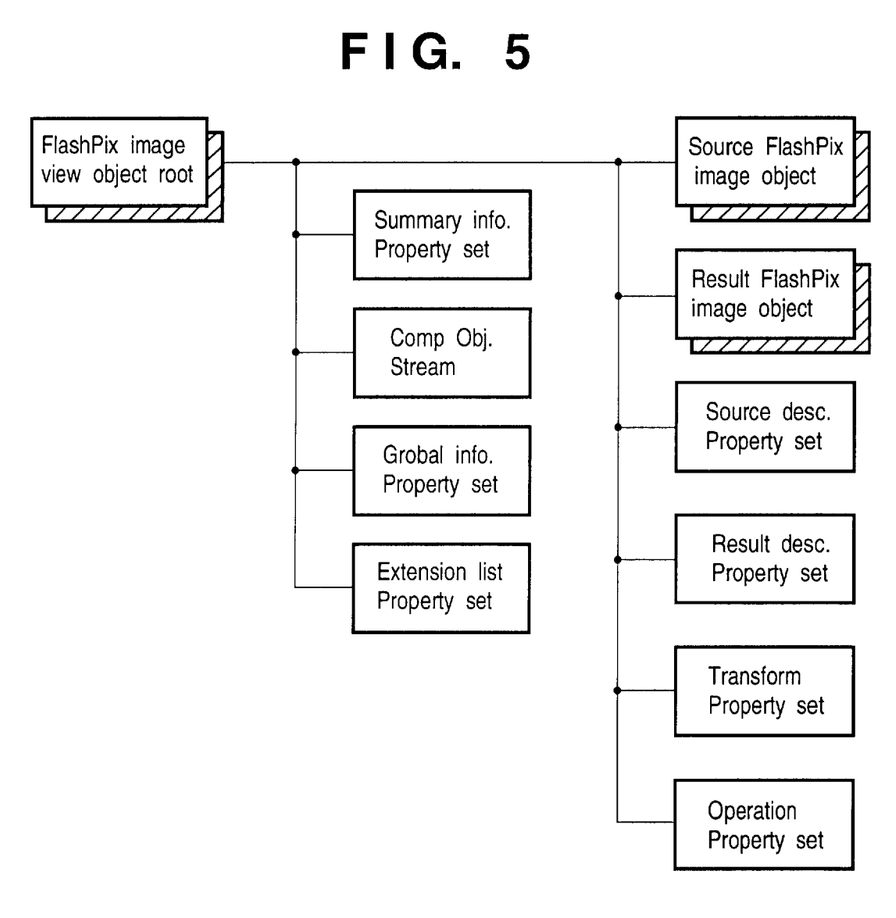
FIG. 5 shows an example of a structured image file.

In an image file in the FlashPix (tradename of Eastman Kodak Company) file format, image attribute information stored in an image header field and image data are further structured and stored in an image file. FIGS. 4 and 5 show the structured image file.

Properties and image data in the image file are managed using "storages" and "streams" corresponding to directories and files used MS-DOS. Referring to FIGS. 4 and 5, blocks with hatches are "storages" and blocks without hatches are "streams". Image data and image attribute information are stored in streams. Image data are hierarchically stored to have different resolutions, and images of the respective resolutions called Subimages, which are indicated by their resolutions 0, 1, . . . , n-1, and n. For an image of each resolution, information required for reading out that image is stored in a Subimage header, and image data itself is stored in Subimage data.

Property Sets categorize and define various kinds of attribute information in correspondence with their use purposes and contents, and include Summary Info. Property Set, Image Info. Property Set, Image Contents Property Set, and Extension List Property Set.

[Explanation of Property Sets]

Summary Info. Property Set is not unique to FlashPix. For example, this Property Set is mandatory for "structured storage" of Microsoft Corp., and stores information such as a title, comment, author, thumbnail image, and the like of that image file.

Figure 8:
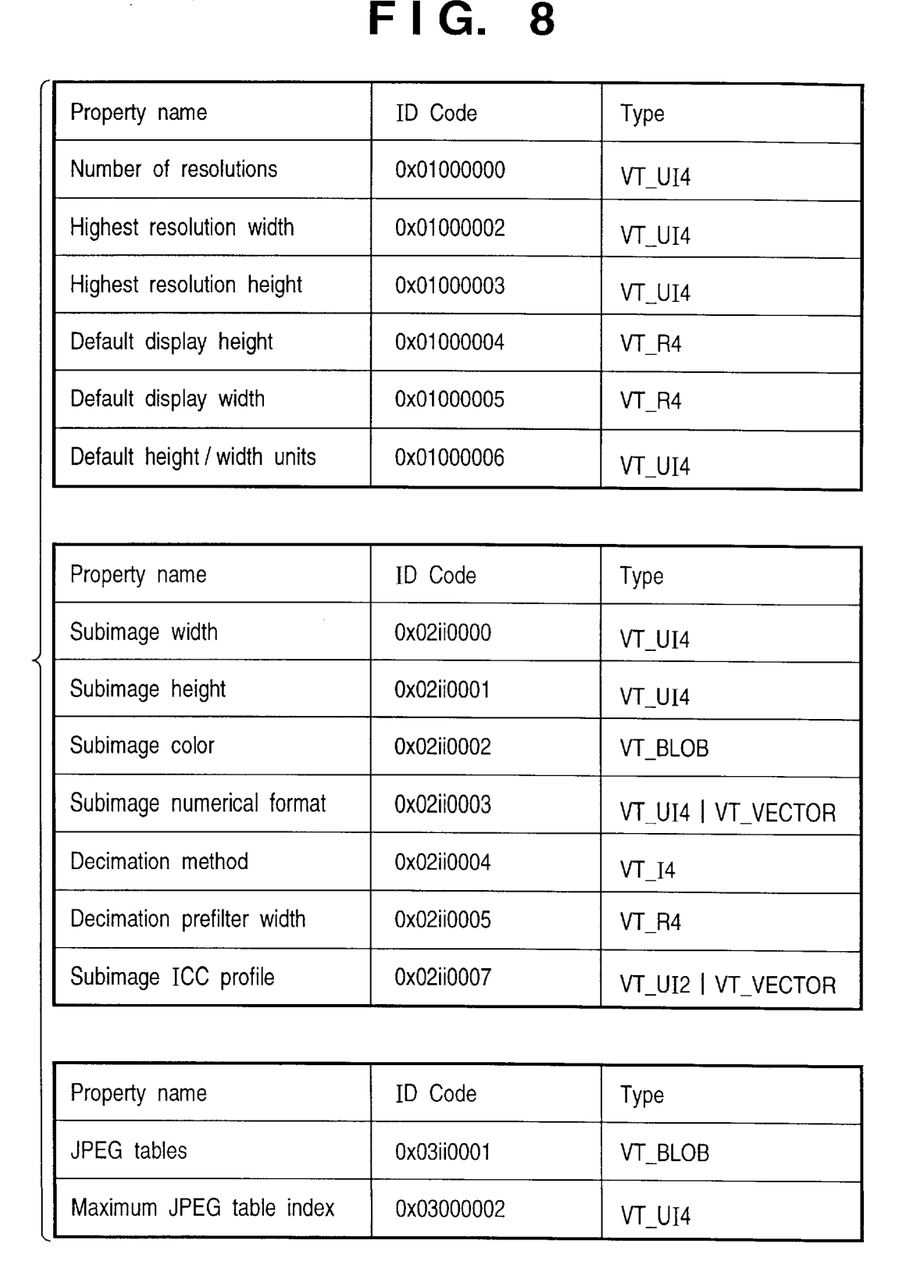
FIG. 8 is a table showing an example of an Image Contents Property Set.

Image Contents Property Set is an attribute that describes the storage method of image data. This attribute describes the number of layers of image data, the width, height, and color depth of an image of a maximum resolution, those of images of the respective resolutions, or definitions of a quantization table/Huffman table upon using JPEG. FIG. 8 shows an example of the Image Contents Property Set.

Image Info. Property Set stores a variety of information that can be exploited upon using an image, e.g., information indicating the way the image was captured, the way the image can be used, and so forth.

An example of such information is as follows.

information (File Source) that pertains to the method of capturing/generating digital data information (Intellectual property) that pertains to the copyright information (Content description) that pertains to the contents of an image (person, location, and the like in an image)

information (Camera information) that pertains to a camera used in image sensing information (Per Picture camera settings) of camera setting upon image sensing (exposure value, shutter speed, focal length, presence/absence of use of an electronic flash, and the like)

information (Digital camera characterization) that pertains to a resolution unique to a digital camera and a mosaic filter information (Film description) of the manufacturer name, product name, type (positive/negative, color/monochrome), and the like of film information (original document scan description) that pertains to the type and size when the original is a document or printed matter information (Scan device) that pertains to a scanner and software used, and the operator of the scanner in case of a scan image Extension List Property Set is a field used when information which is not included in the basic specifications of FlashPix is to be added.

FlashPix Image View Object shown in FIG. 5 is an image file which stores a combination of viewing parameters used upon displaying an image, and image data. The viewing parameters are a set of processing coefficients stored upon applying image rotation, enlargement/reduction, movement, color conversion, and filtering in image display.

Source/Result FlashPix Image Object is an entity of a FlashPix image, Source FlashPix Image Object is mandatory, and Result FlashPix Image Object is optional. Source FlashPix Image Object stores an original image, and Result FlashPix Image Object stores an image processed using the viewing parameters. Source/Result desc. Property set is a property set for identifying the image data, and stores information such as an image ID, a change inhibition property set, a last update date, and the like.

Transform property set stores information such as Affine transform coefficients for rotation, enlargement/reduction, and movement, color conversion matrix, contrast adjustment value, filtering coefficients, and the like.

Handling of image data will be explained below.

Figure 6:
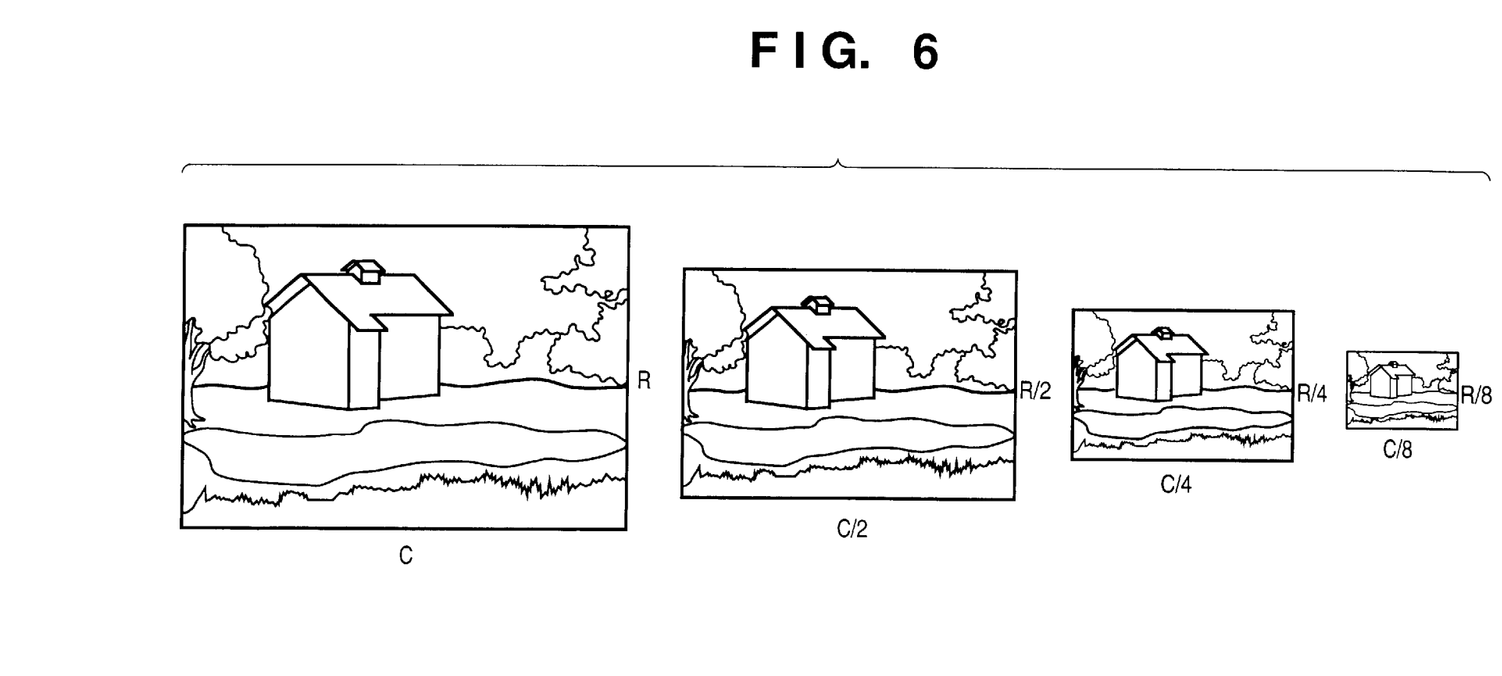
FIG. 6 shows an example of an image file including a plurality of images having different resolutions.

FIG. 6 shows an example of an image file including a plurality of images having different resolutions.

Referring to FIG. 6, an image having a maximum resolution has a size of C×R (column×row), and the next largest image has a size of C/2×R/2. Likewise, a reduction of the column and row sizes to ½ is repeated until the column and row sizes become equal to or smaller than 64 pixels.

As a result of such hierarchizing, "the number of layers per image file", and the aforementioned header information and image data for an image of each layer are required as attribute information of an image. Image Contents Property Set mentioned above describes information that pertains to the number of layers per image file, the width and height of an image having a maximum resolution, or the widths, heights, color depth, compression format, and the like of images of the respective resolutions, as shown in FIG. 8.

Figure 7:
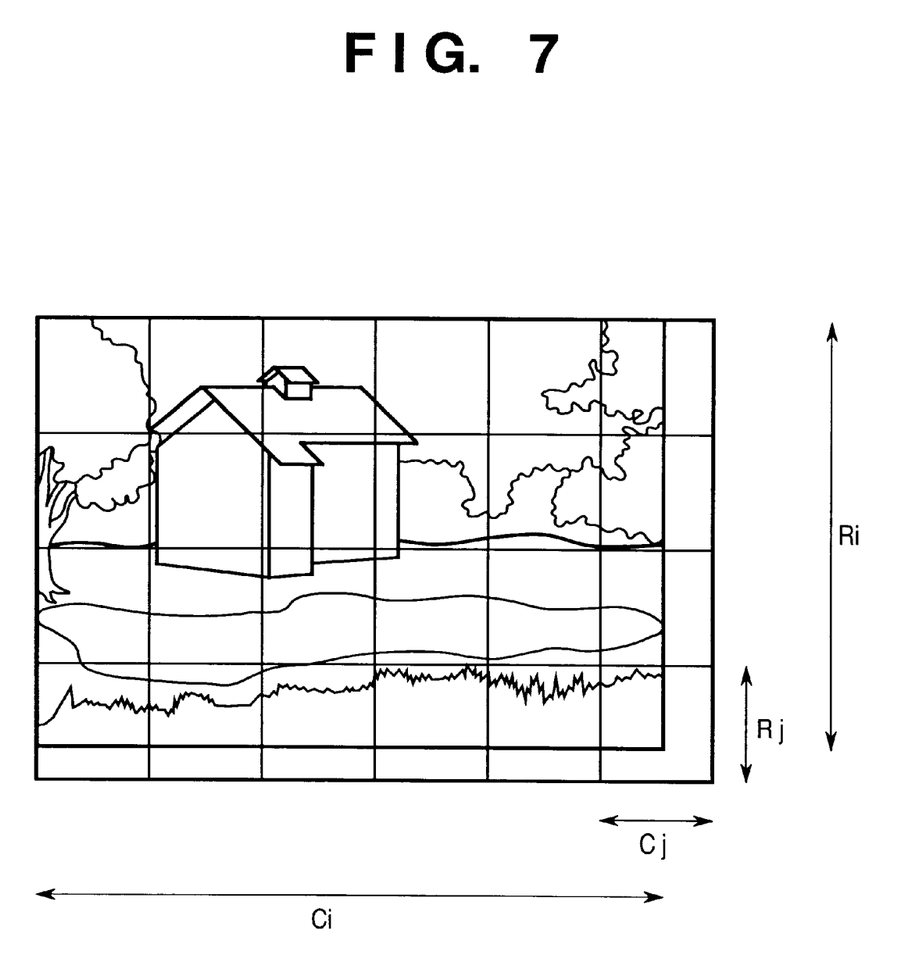
FIG. 7 shows an example of image segmentation into tiles.

Furthermore, an image of each resolution is segmented into 64×64 tiles, as shown in FIG. 7. When an image is segmented into 64×64 tiles in turn from its upper left portion, some images may have some blank tiles at the right and lower ends. In such case, 64×64 pixels are constructed by repetitively inserting the rightmost or lowermost end images. In FlashPix, an image in each tile is stored by one of JPEG compression, single-color compression, and non-compression. Note that JPEG compression is a scheme internationally standardized by ISO/IEC JTC1/SC29, and a description of the scheme itself will be omitted here. Also, single-color compression is a scheme for expressing the color of a given tile by one color without recording individual pixel values only when the tile is formed by an identical color. This scheme is particularly effective for an image generated by computer graphics.

Figure 9:
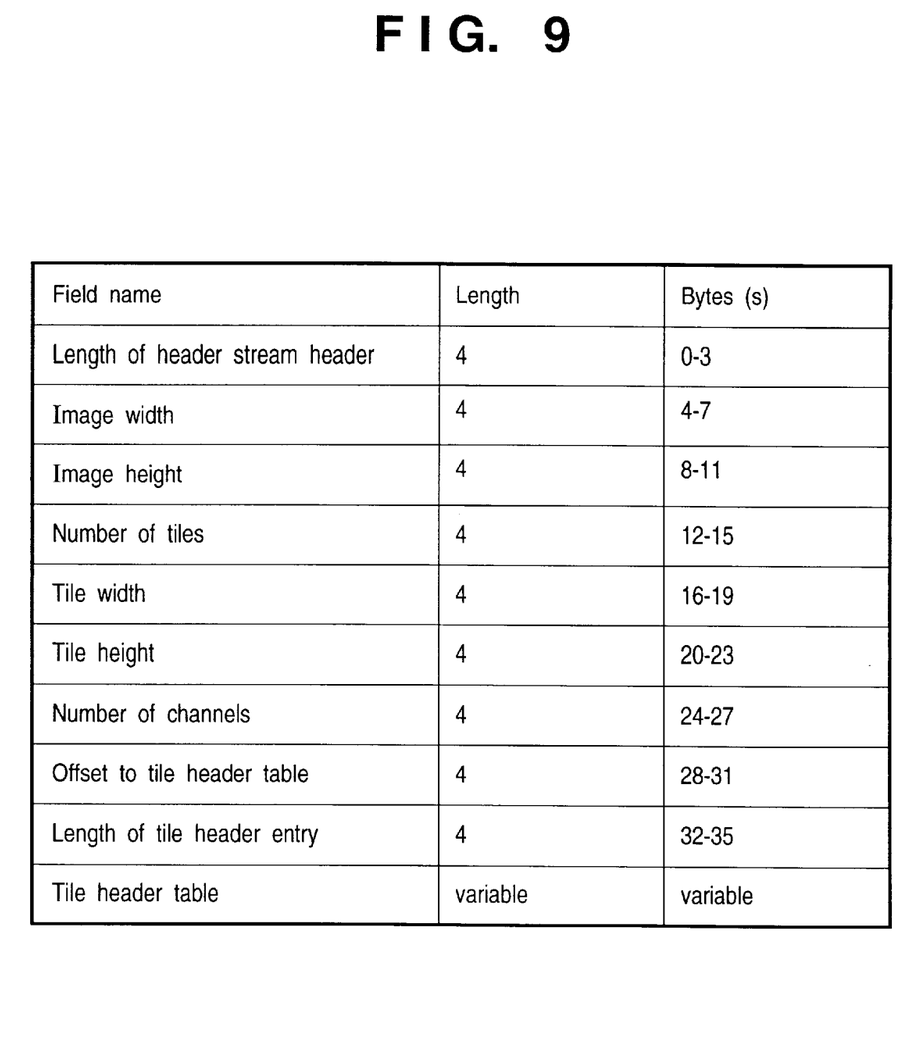
FIG. 9 is a table showing an example of a Subimage header.

These tiled image data are stored in a Subimage data stream, and the total number of tiles, individual tile sizes, data start positions, and compression schemes are stored in Subimage header. FIG. 9 shows an example of this Subimage header.

The operation executed by the arrangement shown in FIG. 1 will be explained below.

An image input by the scanner 2 is converted into a FlashPix image by the FlashPix rasterizer 4, and the FlashPix image is stored in the image memory 6. The optimal character recognition resolution determination circuit 8 reads predetermined portions of images of the respective resolutions from the image memory 6, and performs character recognition of the read portions. Then, the circuit 8 determines an optimal character recognition resolution on the basis of the respective character recognition results.

The character recognition circuit 10 reads out an image of the optimal resolution determined by the optimal character recognition resolution determination circuit 8 from the image memory 6, and performs character recognition of the entire readout image. The operations of the optimal character recognition resolution determination circuit 8 and character recognition circuit 10 will be described in detail later. The output circuit 12 converts the character recognition result of the character recognition circuit 10 in correspondence with the output format (file, printer, display, network and the like), and outputs the converted result.

Figure 10:
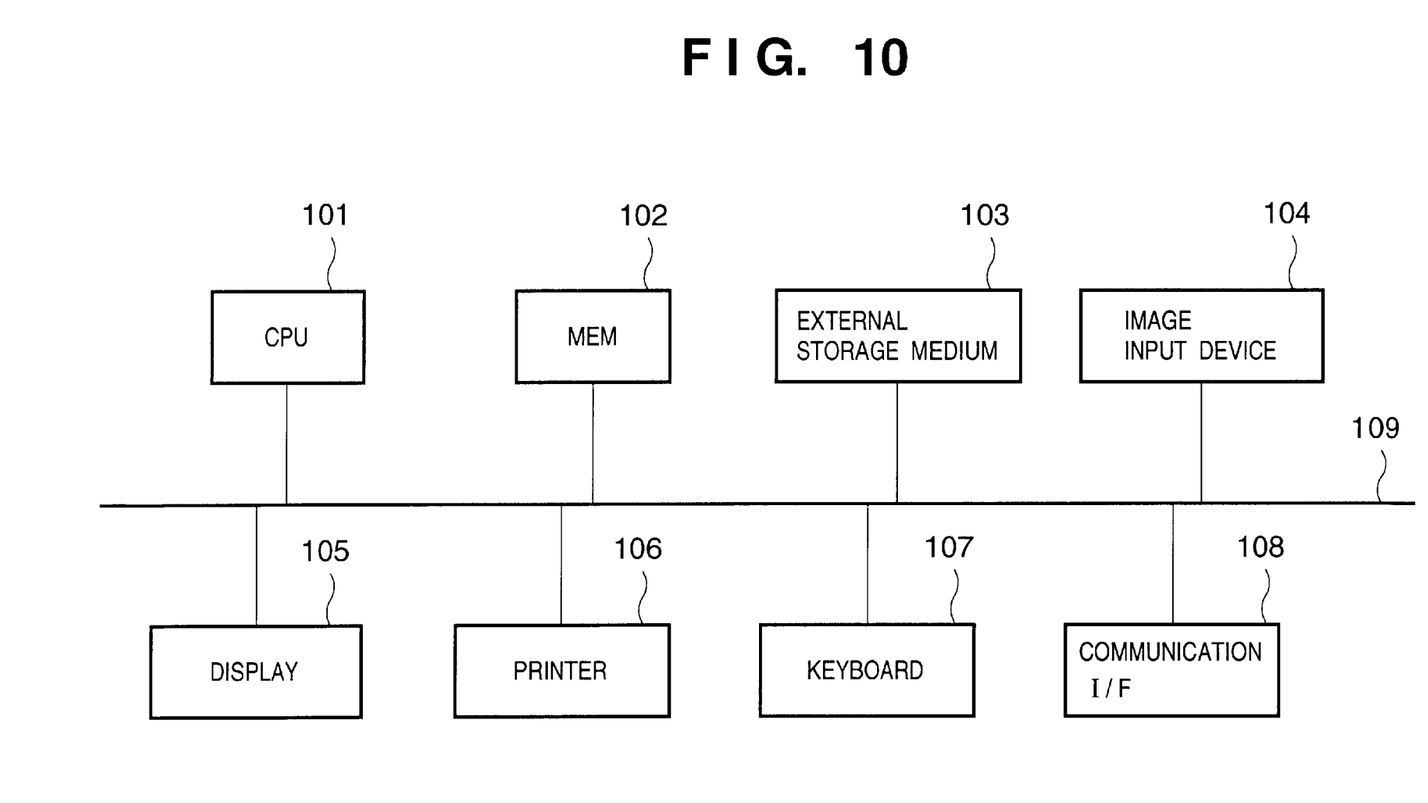
FIG. 10 is a block diagram showing the hardware arrangement of an image processing apparatus according to the present invention.

FIG. 10 shows the hardware arrangement of the image processing apparatus according to the present invention.

The respective building components in FIG. 10 will be explained below as well as association with those in FIG. 1. Reference numeral 101 denotes a CPU (central processing unit), which executes various processes in accordance with program codes stored in a memory (MEM) 102 and external storage medium 103. The processing shown in the flow chart to be described later is executed under the control of the CPU 101. The FlashPix rasterizer 4, optimal character recognition resolution determination circuit 8, and character recognition circuit 10 are implemented by the CPU 101.

Reference numeral 102 denotes a memory including a ROM and RAM. The memory 102 stores an image input from an image input device 104, read from the external storage medium, or input from another terminal via a communication network by a communication I/F 108, image data converted into a file format such as FlashPix or the like, character dictionary data used in character recognition by the character recognition circuit 10, a candidate character group of a recognition result, various parameters used in processing to be described later, and the like. The memory 102 has a working memory area for storing data whose processing is underway. The image memory 6 is implemented by this memory 102.

Reference numeral 103 denotes an external storage medium such as a CD-ROM, CD-R, FD, or the like, which is detachable from the apparatus of this embodiment, and in or from which an image, the program codes of a control program, an image file of the processing result, text, and the like can be stored or read out. Reference numeral 104 denotes an image input device such as a scanner, digital camera, or the like for optically scanning an original image. The scanner 2 corresponds to the image input device 104. Reference numeral 105 denotes a display such as a CRT, liquid crystal display, or the like for displaying an image, text, messages during processing, and the like. Also, the display 105 displays data input at a keyboard 107 and operation windows.

Reference numeral 106 denotes a printer such as an LBP (laser beam printer), ink-jet printer, or the like for recording an image, text, and the like. Reference numeral 107 denotes a keyboard which can input various commands, character codes, and the like upon operation by an operator. In place of or in addition to the keyboard 107, a coordinate input device such as a mouse, tablet, or the like, which can input coordinate data may be equipped. Reference numeral 108 denotes a communication I/F which exchanges data, commands, and the like with another terminal via a communication network (public network or LAN). Reference numeral 109 denotes a bus which allows various building components to exchange data, commands, and the like with each other.

The processes executed by the optimal character recognition resolution determination circuit 8 and character recognition circuit 10 will be described in detail below with reference to FIGS. 2 and 3.

Figure 2:
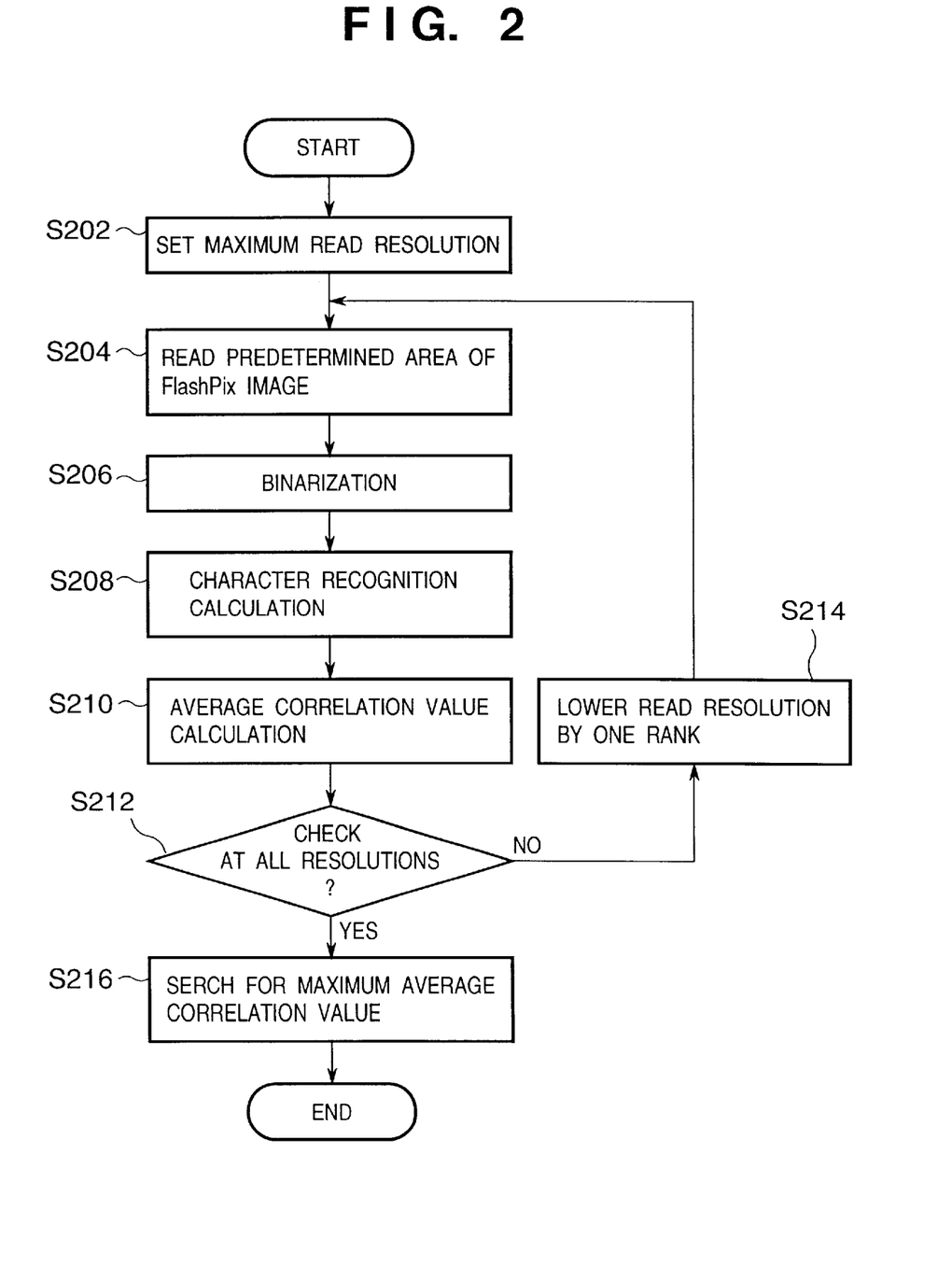
FIG. 2 is a flow chart showing the details of processing executed by an optimal character recognition resolution determination circuit in the first embodiment of the present invention.

FIG. 2 is a flow chart showing the details of processing executed by the optimal character recognition resolution determination circuit according to the first embodiment of the present invention.

In step S202, the read resolution parameter in the memory 102 that stores the read resolution of a FlashPix image to be read in step S204 is set at the maximum resolution of FlashPix images to be processed. In step S204, a predetermined area of an image having a resolution indicated by the read resolution parameter of the FlashPix image stored in the image memory 6 is read out. Assume that the predetermined area is a first block in text blocks contained in the image. In step S206, the readout image is converted into a binary image. In step S208, the binary image undergoes a series of character recognition operations including character extraction and correlation calculations by the character recognition circuit 10. In step S210, the average correlation value of the correlation values for the respective characters is calculated as an evaluation value of character recognition with respect to the image read in step S204. This average correlation value is obtained by summing up all similarity values of first candidate characters obtained as character recognition results in step S208, and dividing the sum by the number of characters. The calculated average correlation value is stored in the memory 102 in correspondence with the image resolution.

It is checked in step S212 if the process for calculating the average correlation value in steps S204 to S210 is done for images of all resolutions up to the minimum resolution of FlashPix images to be processed. If it is determined that the average correlation values of the images of all the resolutions have not yet been calculated (NO in step S212), the flow advances to step S214. In step S214, the resolution set as the current read resolution parameter is lowered by one rank, and is set in the memory 102. After that, the flow returns to step S204. On the other hand, if it is determined that the average correlation values of all the resolutions have been calculated (YES in step S212), the flow advances to step S216. In step S216, the average correlation values of the images of all the resolutions stored in the memory 102 are searched for a maximum value, and the resolution of the image that yields the maximum value is set in the memory 102 as an optimal character recognition resolution, thus ending the processing.

If the maximum value found by search is smaller than a given threshold value pre-stored in the memory 102, i.e., if the similarity is low, the area to be read out in step S204 is switched to another area (e.g., the second extracted text block), and the processes in steps S202 to S216 may be repeated. Also, the optimal character recognition resolution data obtained in step S216 may be stored in the FlashPix image.

Figure 3:
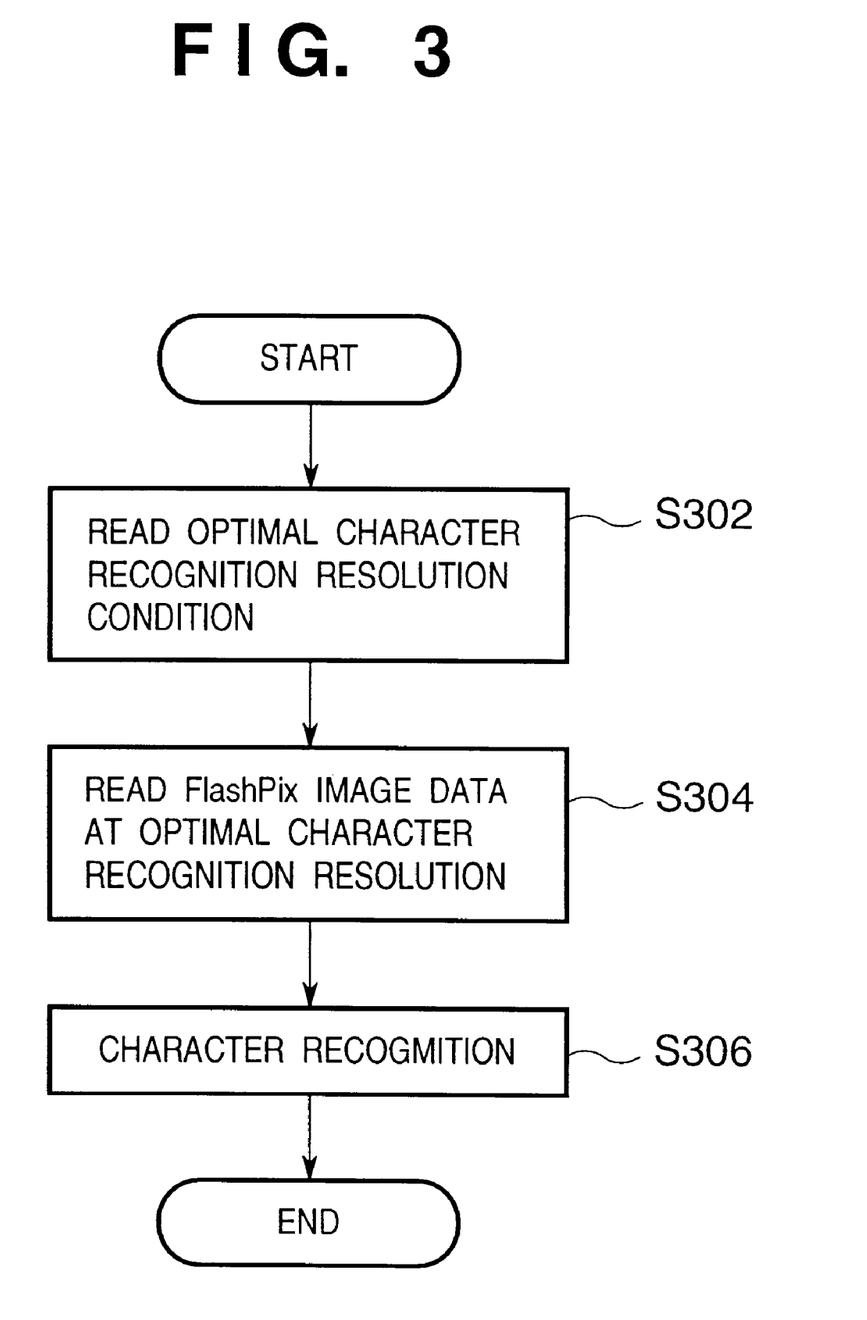
FIG. 3 is a flow chart showing the details of processing executed by a character recognition circuit in the first embodiment of the present invention.

FIG. 3 is a flow chart showing the details of processing executed by the character recognition circuit according to the first embodiment of the present invention.

In step S302, the optimal character recognition resolution stored in the memory 102 by the optimal character recognition resolution determination circuit 8 is read. In step S304, a FlashPix image having the read optimal character recognition resolution is read out from the image memory 6. In step S306, the character recognition circuit 10 performs character recognition of the entire image read out from the image memory 6. Text of the recognition result may be stored in the file format of a FlashPix image, or may be output by the display 105, printer 106, or communication I/F 108.

As described above, according to the first embodiment, the optimal character recognition resolution determination circuit 8 can determine a resolution optimal to character recognition in advance, and character recognition is done using a FlashPix image of the determined resolution, thus greatly improving character recognition precision.

[Second Embodiment]

The optimal character recognition resolution determination circuit 8 of the first embodiment extracts a given area of an image to determine an optimal character recognition resolution. However, the present invention is not limited to such specific method. For example, when image data to be subjected to character recognition is multi-page image data including a plurality of pages, the first page may be extracted to determine an optimal character recognition resolution, and images of all the pages may undergo character recognition using the determined optimal character recognition resolution.

In the first and second embodiment, FlashPix images are used. However, the present invention is not limited to such specific image format. For example, another format data such as CIFF (Canon Image Format File) (tradename of Canon Inc.) which can store or generate a plurality of images of different resolutions may be used.

In the first embodiment, the read resolution is set at the maximum level in step S202, and an optimal character recognition resolution is determined while lowering the resolution in step S214. However, the present invention is not limited to such specific method. For example, the read resolution may be set at the lowest level in step S202, and checking may be done at all resolutions while increasing the resolution level rank by rank in step S214, thus determining an optimal character recognition resolution.

Figure 11:
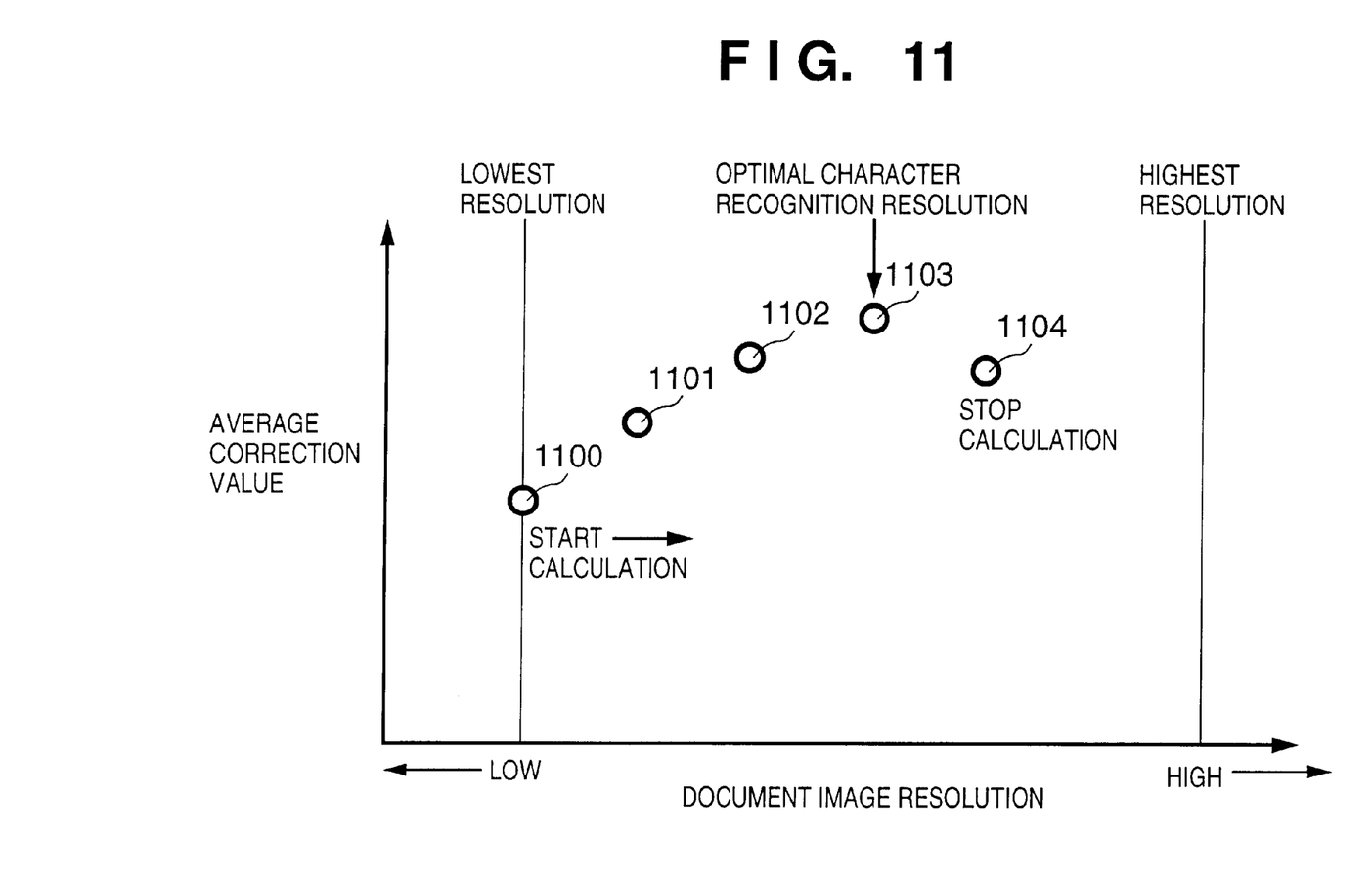
FIG. 11 is a graph showing the hysteresis of average correlation values.

In the first embodiment, the maximum value of average correlation values obtained from images of all resolutions is detected, and the resolution that yields the maximum value is determined as an optimal character recognition resolution. However, the present invention is not limited to such specific method. For example, the hysteresis of the average correlation values obtained at the respective resolutions may be monitored, and when the value obtained in step S210 indicates a peak, the resolution of the image which yields that value may be determined as an optimal character recognition resolution, and the process for calculating the average value correlation value of an image of the next resolution may be stopped. FIG. 11 shows the hysteresis of average correlation values when the average correlation values are calculated in turn from an image of the lowest resolution level. When a value 1104 is obtained, it is determined that a value 1103 corresponds to a peak, and the calculation is stopped.

To restate, according to the first and second embodiments, character recognition precision levels are discriminated at a plurality of resolutions of an identical image, and an image with an optimal resolution is selected based on the discrimination result to execute character recognition, thus greatly improving character recognition precision.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus. The processing steps described in the above flow charts are executed under the control of the CPU in accordance with this program code.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
    input means for inputting an image file including a plurality of images, each of the plurality of images being generated from the same document and having a different resolution from the other images;
    determination means for determining, from the resolutions of the plurality of images included in the image file, a preferred resolution that is better than another of the resolutions for executing character recognition of the input image file,
    wherein said determination means executes character recognition of a predetermined area of the plurality of images included in the input image file, and determines the preferred resolution based on evaluation values of the character recognition result of the predetermined area of the plurality of images included in the input image file;
    recognition means for performing character recognition of one of the plurality of images included in the input image file having the preferred resolution determined by said determination means; and
    output means for outputting a recognition result of said recognition means.

2. The apparatus according to claim 1, further comprising conversion means for converting an image generated from the document into the input image file including the plurality of images.

3. The apparatus according to claim 1, wherein said determination means determines the preferred resolution on the basis of average correlation values calculated as the evaluation values.

4. An image processing apparatus comprising:
    input means for inputting an image file including a plurality of images, each of the plurality of images being generated from the same document and having a different resolution from the other images;
    determination means for determining, from the resolutions of the plurality of images included in the image file, a preferred resolution that is better than another of the resolutions for executing character recognition of the input image file,
    wherein said determination means executes character recognition of a predetermined area of the plurality of images included in the image file in ascending order of resolution, stops character recognition of the predetermined area of the plurality of images included in the image file when a hysteresis of average correlation values for the respective character recognition in the ascending order of resolution indicates a peak, and determines the preferred resolution to be used upon executing character recognition of the input image file by said recognition means on the basis of the resolution when the hysteresis indicates the peak;
    recognition means for performing character recognition of one of the plurality of images included in the input image file having the preferred resolution determined by said determination means; and
    output means for outputting a recognition result of said recognition means.

5. An image processing apparatus comprising:
    input means for inputting an image file including a plurality of images, each of the plurality of images being generated from the same document and having a different resolution from the other images;
    determination means for determining, from the resolutions of the plurality of images included in the image file, a preferred resolution that is better than another of the resolutions for executing character recognition of the input image file,
    wherein said determination means executes character recognition of a predetermined area of the plurality of images included in the image file in descending order of resolution, stops character recognition of the predetermined area of the plurality of images included in the image file when a hysteresis of average correlation values for the respective character recognition in the descending order of resolution indicates a peak, and determines the preferred resolution to be used upon executing character recognition of the input image file by said recognition means on the basis of the resolution when the hysteresis indicates the peak;
    recognition means for performing character recognition of one of the plurality of images included in the input image file having the preferred resolution determined by said determination means; and
    output means for outputting a recognition result of said recognition means.

6. An image processing method comprising:
    an input step of inputting an image file including a plurality of images, each of the plurality of images being generated from the same document and having a different resolution from the other images;
    a determination step of determining, from the resolutions of the plurality of images included in the image file, a preferred resolution that is better than another of the resolutions for executing character recognition of the input image file,
    wherein said determination step includes the steps of executing character recognition of a predetermined area of the plurality of images included in the input image file, and determining the preferred resolution based on evaluation values of the character recognition result of the predetermined area of the plurality of images included in the input image file;
    a recognition step of performing character recognition of one of the plurality of images included in the input image file having the preferred resolution determined in said determination step; and
    an output step of outputting a recognition result of said recognition step.

7. The method according to claim 6, further comprising a conversion step for converting an image generated from the document into the input image file including the plurality of images.

8. The method according to claim 6, wherein said determination step includes the step of determining the preferred resolution on the basis of average correlation values calculated as the evaluation values.

9. An image processing method comprising:

an input step of inputting an image file including a plurality of images, each of the plurality of images being generated from the same document and having a different resolution from the other images;

a determination step of determining, from the resolutions of the plurality of images included in the image file, a preferred resolution that is better than another of the resolutions for executing character recognition of the input image file, wherein said determination step includes the steps of executing character recognition of a predetermined area of the plurality of images included in the image file in ascending order of resolution, stopping character recognition of the predetermined area of the plurality of images included in the image file when a hysteresis of average correlation values for the respective character recognition in the ascending order of resolution indicates a peak, and determining the preferred resolution to be used upon executing character recognition of the input image file in said recognition step on the basis of the resolution when the hysteresis indicates the peak;

a recognition step of performing character recognition of one of the plurality of images included in the input image file having the preferred resolution determined in said determination step; and an output step of outputting a recognition result of said recognition step.

10. An image processing method comprising:

an input step of inputting an image file including a plurality of images, each of the plurality of images being generated from the same document and having a different resolution from the other images;

a determination step of determining, from the resolutions of the plurality of images included in the image file, a preferred resolution that is better than another of the resolutions for executing character recognition of the input image file, wherein the determination step includes the steps of executing character recognition of a predetermined area of the plurality of images included in the image file in descending order of resolution, stopping character recognition of the predetermined area of the plurality of images included in the image file when a hysteresis of average correlation values for the respective character recognition in the descending order of resolution indicates a peak, and determining the preferred resolution to be used upon executing character recognition of the input image file in said recognition step on the basis of the resolution when the hysteresis indicates the peak;

a recognition step of performing character recognition of one of the plurality of images included in the input image file having the preferred resolution determined in said determination step; and an output step of outputting a recognition result of said recognition step.

11. A computer-readable memory comprising:

a program code of an input step of inputting an image file including a plurality of images, each of the plurality of images being generated from the same document and having a different resolution from the other images;

a program code of a determination step of determining, from the resolutions of the plurality of images included in the image file, a preferred resolution that is better than another of the resolutions for executing character recognition of the input image file, wherein the determination step includes the steps of executing character recognition of a predetermined area of the plurality of images included in the input image file, and determining the preferred resolution based on evaluation values of the character recognition result of the predetermined area of the plurality of images included in the input image file;

a program code of a recognition step of performing character recognition of one of the plurality of images included in the input image file having the preferred resolution determined in the determination step; and a program code of an output step of outputting a recognition result of the recognition step.

12. An image processing apparatus comprising:

input means for inputting file data including a plurality of images, each of the plurality of images being generated from the same document and having a different resolution;

determination means for determining, from the resolutions of the plurality of images included in the file data, a preferred resolution that is better than another of the resolutions for executing character recognition of the file data; and wherein said determination means executes character recognition of a predetermined area of the plurality of images included in the input file data, and determines the preferred resolution based on evaluation values of the character recognition result of the predetermined area of the plurality of images included in the input file data;

control means for storing information of the preferred resolution determined by said determination means in the file data.

13. The apparatus according to claim 12, wherein the predetermined area is a partial area image in each of the plurality of images.

14. The apparatus according to claim 13, wherein when the character recognition result of the partial area image by said determination means is smaller than a predetermined value, the preferred resolution is determined by executing character recognition of a partial area different from the area for which the character recognition has been done.

15. The apparatus according to claim 12, wherein the predetermined area is a predetermined text block in each of the plurality of images.

16. The apparatus according to claim 12, further comprising:

image read-out means for reading out one of the plurality of images having the preferred resolution determined by said determination means from the file data;

character recognition means for executing character recognition of the image read out by said image read-out means; and output means for outputting a character recognition result of said character recognition means.

17. An image processing method comprising the steps of:

inputting file data including a plurality of images, each of the plurality of images being generated from the same document and having a different resolution;

determining, from the resolutions of the plurality of images included in the file data, a preferred resolution that is better than another of the resolutions for executing character recognition of the file data, wherein said determination step includes the steps of executing character recognition of a predetermined area of the plurality of images included in the input file data, and determining the preferred resolution based on evaluation values of the character recognition result of the predetermined area of the plurality of images included in the input file data; and storing information of the preferred resolution determined in said determining step in the file data.

18. The method according to claim 17, wherein the predetermined area is a partial area image in each of the plurality of images.

19. The method according to claim 18, wherein when the character recognition result of the partial area image is smaller than a predetermined value, the preferred resolution is determined in said determining step by executing character recognition of a partial area different from the area for which the character recognition has been done.

20. The method according to claim 17, wherein the predetermined area is a predetermined text block in each of the plurality of images.

21. The method according to claim 17, further comprising the steps of:

reading out one of the plurality of images having the preferred resolution from the file data;

executing character recognition of the image read out in said reading out step; and outputting a character recognition result from said executing step.

22. A computer-readable memory comprising:

a program code of an input step of inputting file data including a plurality of images, each of the plurality of images being generated from the same document and having a different resolution;

a program code of a determination step of determining, from the resolutions of the plurality of images included in the file data, a preferred resolution that is better than another of the resolutions for executing character recognition of the file data, wherein the determination step includes the steps of executing character recognition of a predetermined area of the plurality of images included in the input file data, and determining the preferred resolution based on evaluation values of the character recognition result of the predetermined area of the plurality of images included in the input file data; and a program code of a storage step of storing information of the preferred resolution determined in the determination step in the file data.

* * * * *

UNITED STATES PATENT AND TRADEMARK OFFICE
CERTIFICATE OF CORRECTION

PATENT NO. : 6,668,101 B2
DATED : December 23, 2003
INVENTOR(S) : Kaneda

It is certified that error appears in the above-identified patent and that said Letters Patent is hereby corrected as shown below:

Column 1,
Lines 32, 48 and 64, "determining," should read -- determining --.

Column 2,
Lines 13 and 39, "determining," should read -- determining --;
Line 27, "determine," should read -- determine --; and

Column 3,
Line 53, "used" should read -- using --.

Column 5,
Line 10, "information" and should read -- information, --.

Column 12,
Line 24, "data; and" should read -- data, --; and
Line 31, "data;" should read -- data; and --.

Signed and Sealed this

Tenth Day of August, 2004

JON W. DUDAS
*Acting Director of the United States Patent and Trademark Office*